United States Patent [19]
Ozbutun et al.

[11] Patent Number: 6,067,540
[45] Date of Patent: May 23, 2000

[54] BITMAP SEGMENTATION

[75] Inventors: Cetin Ozbutun, San Carlos; Jeffrey I. Cohen, Sunnyvale; Hakan Jakobsson, San Francisco; Mark Kremer, Sunnyvale; Michael Depledge, San Jose; Quoc Tai Tran, Redwood Shores; Alexander C. Ho, Belmont; Julian Hyde, San Francisco, all of Calif.

[73] Assignee: Oracle Corporation, Redwood Shores, Calif.

[21] Appl. No.: 08/808,584

[22] Filed: Feb. 28, 1997

(Under 37 CFR 1.47)

[51] Int. Cl.[7] .................................................. G06F 17/30
[52] U.S. Cl. ................. 707/3; 707/2; 707/3; 707/10; 707/502
[58] Field of Search ................. 707/3, 10, 502, 707/2

[56] References Cited

U.S. PATENT DOCUMENTS

| | | | |
|---|---|---|---|
| 5,404,411 | 4/1995 | Banton et al. | 382/254 |
| 5,442,715 | 8/1995 | Gaborski et al. | 382/187 |
| 5,465,322 | 11/1995 | Hsu et al. | 395/114 |
| 5,495,608 | 2/1996 | Antoshenkov | 707/10 |
| 5,502,804 | 3/1996 | Butterfield et al. | 707/502 |
| 5,552,898 | 9/1996 | Deschuytere | 358/426 |
| 5,604,850 | 2/1997 | Whitmer | 345/435 |
| 5,642,473 | 6/1997 | Klotz, Jr. | 385/117 |
| 5,649,181 | 7/1997 | French et al. | 707/3 |
| 5,706,495 | 1/1998 | Chandha et al. | 707/2 |
| 5,751,921 | 5/1998 | Fujimoto | 395/109 |

FOREIGN PATENT DOCUMENTS

| | | | |
|---|---|---|---|
| 0 606 137 A2 | 1/1994 | European Pat. Off. | G03F 15/00 |

OTHER PUBLICATIONS

Ringtree : A VLSI Architecture For Fast Image Generation And Processing, K. S. Eo et al., ISCAS'88 pp. 801–804. Aug. 1988.

Generating Automatically Tuned Bitmaps from Outlines, John D. Hobby, AT & T Bell Labs, Journal of the Association for Computing Machinery, vol. 40, No. 1, Jan. 1993, pp. 48–94.

Oracle8 Indexing Strategies, An Oracle Technical White Paper, Jun. 1997, pp. 1–14.

"SQL *TextRetrieval Administrator's Guide", Version 2.0, Oracle Corporation, Rev. Jul., 1992 (Part No. 0365–20–0792).

Patrick O'Neil and Goetz Graefe, "Multi–Table Joins Through Bitmapped Join Indices", SIGMOD Record, vol. 24, No. 23, Sep. 1995.

IOUW wrap–up (vendors introduce database tools at International Oracle Users Week conference) (Client/server Connection)(Industry Trend or Event) DBMS, v8 n13, p112(1), Dec. 1995.

"Oracle TextServer3 Concepts, Version 3," Oracle Corporation (Part No. A24984–1, 1995, pp. 3–1 to 3–23).

"Oracle Textserver3 Concepts, Release 3.1," Oracle Corporation (Part No. A41697–2), 1996, pp. 3–1 to 3–29.

*Primary Examiner*—Wayne Amsbury
*Assistant Examiner*—Shahid Alam
*Attorney, Agent, or Firm*—McDermott, Will & Emery

[57] ABSTRACT

A method and apparatus for segmenting bitmaps in a bitmap index is provided. A segmented bitmap includes a plurality of bitmap segments that are used to indicate which records in a body of records that is associated with the segmented bitmap satisfy a particular criteria. Each bitmap segment contains a string of bits that correspond to a corresponding range of records in the body of records. There may be gaps between the ranges represented by the bitmap segments when, for example, the body of records does not contain records in a particular range. For the purposes of retrieval, compression, de-compression, locking and logging, the database system treats each bitmap segment as a distinct data item.

34 Claims, 4 Drawing Sheets

TABLE 100

| 1 | LINDA | F |
|---|-------|---|
| 2 | BERT | M |
| 3 | JACK | M |
| 4 | EDDY | M |
| 5 | GREG | M |
| 6 | MIKE | M |
| 7 | ALICE | F |
| 8 | FRED | M |
| 9 | PETER | M |
| 10 | RUSS | M |

FIG. 1

TABLE 300

| 1 | LINDA | F |
|---|---|---|
| 2 | BERT | M |
| 3 | JACK | M |
| 4 | EDDY | M |

⋮

| 1000 | GREG | M |
|---|---|---|
| 1001 | MIKE | M |
| 1002 | ALICE | F |

⋮

| 3000 | FRED | M |
|---|---|---|
| 3001 | PETER | M |

⋮

| 5000 | RUSS | M |

Fig. 3a

BITMAP 302

BITMAP SEGMENTATION

RELATED APPLICATIONS

The present application is related to: U.S. patent application Ser. No. 08/807,344, entitled "CREATING BITMAPS FROM MULTI-LEVEL IDENTIFIERS" now pending, filed by Cetin Ozbutun, Michael Depledge, Hakan Jakobsson, Mark Kremer, Jeffrey I. Cohen, Quoc Tai Tran, and Alexander C. Ho on the equal day herewith, the contents of which are incorporated herein by reference.

U.S. patent application Ser. No. 08/752,128, entitled "METHOD AND APPARATUS FOR PROCESSING COUNT STATEMENTS IN A DATABASE SYSTEM" U.S. Pat. No. 5,819,256, filed by Cetin Ozbutun, Michael Depledge, Hakan Jakobsson, and Jeffrey I. Cohen, on Nov. 20, 1996, the contents of which are incorporated herein by reference.

U.S. patent application Ser. No. 08/808,097, entitled "GROUP BY AND DISTINCT SORT ELIMINATION USING COST-BASED OPTIMIZATION" U.S. Pat. No. 5,822,748, filed by Jeffrey Ira Cohen, Cetin Ozbutun, Michael Depledge, and Hakan Jakobsson, on the equal day herewith, the contents of which are incorporated herein by reference.

U.S. patent application Ser. No. 08/808,096, entitled "METHOD AND APPARATUS FOR USING INCOMPATIBLE TYPES OF INDEXES TO PROCESS A SINGLE QUERY" now pending, filed by Jeffrey Ira Cohen, Cetin Ozbutun, Hakan Jakobsson, and Michael Depledge, on the equal day herewith, the contents of which are incorporated herein by reference.

U.S. patent application Ser. No. 08/808,094, entitled "INDEX SELECTION FOR AN INDEX ACCESS PATH" now pending, filed by Hakan Jakobsson, Michael Depledge, Cetin Ozbutun, and Jeffrey I. Cohen, on the equal day herewith, the contents of which are incorporated herein by reference.

U.S. patent application Ser. No. 08/807,429, entitled "QUERY PROCESSING USING COMPRESSED BITMAPS" now pending, filed by Cetin Ozbutun, Jeffry I. Cohen, Michael Depledge, Julian Hyde, Hakan Jakobsson, Mark Kremer, and Quoc Tai Tran, on the equal day herewith, the contents of which are incorporated herein by reference.

U.S. patent application Ser. No. 08/807,451, entitled "BITMAPPED INDEXING WITH HIGH GRANULARITY LOCKING" now pending, filed by Michael Depledge, Jeffrey I. Cohen, Hakan Jakobsson, Mark Kremer, Cetin Ozbutun, Quoc Tai Tran, and Alexander C. Ho, on the equal day herewith, the contents of which are incorporated herein by reference.

U.S. patent application Ser. No. 08/808,585, entitled "UPDATING BITMAPPED INDEXES" U.S. Pat. No. 5,884,307, filed by Michael Depledge, Hakan Jakobsson, Cetin Ozbutun, Jeffrey I. Cohen, and Quoc Tai Tran, on the equal day herewith, the contents of which are incorporated herein by reference.

U.S. patent application ser. No. 08/808,560, entitled "BITMAP INDEX COMPRESSION" now pending, filed by Jeffrey I. Cohen, Michael Depledge, Hakan Jakobsson, Mark Kremer, Cetin Ozbutin, and Quoc Tai Tran, on the equal day herewith, the contents of which are incorporated herein by reference.

U.S. patent application Ser. No. 08/808,586, entitled "COMBINING BITMAPS WITHIN A MEMORY LIMIT" now pending, filed by Cetin Ozbutun, Jeffry I. Cohen, Michael Depledge, Julian Hyde, Hakan Jakobsson, Mark Kremer, and Quoc Tai Tran, on the equal day herewith, the contents of which are incorporated herein by reference.

FIELD OF THE INVENTION

The present invention relates to databases, and more particularly, to the maintenance and storage of bitmap indexes used to access data stored in databases.

BACKGROUND OF THE INVENTION

A bitmap index is an index that includes a set of bitmaps that can be used to efficiently process queries on a body of data associated with the bitmap index. In the context of bitmap indexes, a bitmap is a series of bits that indicate which of the records stored in the body of data satisfy a particular criteria. Each record in the body of data has a corresponding bit in the bitmap. Each bit in the bitmap serves as a flag to indicate whether the record that corresponds to the bit satisfies the criterion associated with the bitmap.

Typically, the criterion associated with a bitmap is whether the corresponding records contain a particular key value. In the bitmap for a given key value, all records that contain the key value will have their corresponding bits set to 1 while all other bits are set to 0. A collection of bitmaps for the key values that occur in the data records can be used to index the data records. In order to retrieve the data records with a given key value, the bitmap for that key value is retrieved from the index and, for each bit set to 1 in the bitmap, the corresponding data record is retrieved. The records that correspond to bits are located based on a mapping function between bit positions and data records.

For example, FIG. 1 illustrates a table 100 that contains ten rows, where each row contains a name and a gender indicator. Rows 2, 3, 4, 5, 6, 8, 9 and 10 contain male gender indicators. Rows 1 and 7 contain female gender indicators. Therefore, the bitmap of table 100 for the criterion "GENDER=MALE" would be 0111110111, where the "1"s in positions 2–6 and 8–10 indicate that the second through sixth and eighth through tenth rows of table 100 satisfy the "GENDER=MALE" criterion, and the zeros in the first and seventh positions indicate that first and seventh rows in table 100 do not satisfy the "GENDER=MALE" criterion.

When retrieving data using a bitmap index, several logical retrieval conditions may be combined using Boolean operations on the appropriate bitmaps. For example, if the data that is to be retrieved is subject to the conditions that key1=<val1> and key2=<val2>, a bitwise AND of the bitmaps for key values <val1> and <val2> can be performed to generate a bitmap that indicates the data items that match both conditions.

Database systems that support bitmap indexes treat, store and maintain each bitmap as an atomic contiguous data item. Thus, all locking, logging and manipulating of a bitmap is performed for the bitmap as a unit. Unfortunately, this conventional use of bitmap indexes has some significant drawbacks.

For example, when a change needs to be made to a bit in a bitmap, a lock on the bitmap is obtained before updating the bitmap so that other processes cannot concurrently update the bitmap in an inconsistent manner. In a system where concurrent inserts, deletes and/or updates of the data are taking place and some form of locking mechanism is used to ensure consistency, locking an entire bitmap prevents concurrent execution of transactions that are affecting different bits within the same logical bitmap.

Many databases employ a consistency model that requires changes to the data to be logged to disk. When logging is used with bitmap indexes, the entire bitmap is recorded in the log as an atomic unit for each change made to the bitmap. Such logging involves considerable processing time and disk-I/O, especially when large bitmaps are involved.

Further, treating a bitmap as an atomic unit may require significant disk-I/O and memory usage. If an entire bitmap has to be retrieved as an atomic unit from the bitmap index, the cost in terms of disk-I/O and memory can be substantial even when information from only a small part of the bitmap is actually be needed.

During information retrieval operations, the information in large portions of a bitmap may not be relevant. For example, if an AND operation is being performed between two bitmaps and the first bitmap contains a long sequence of zeros, the information contained in the portion of the second bitmap that corresponds to those zeros is irrelevant, since the result of an AND operation with a zero will always be zero. However, because bitmaps are stored and treated as atomic data items, all bits within both bitmaps will be loaded and processed.

Based on the foregoing, it is clearly desirable to provide a database system in which bitmap indexes may be used with less resource consumption than is currently experienced. It is further desirable to reduce the overhead involved in logging changes made to bitmaps within a bitmap index. It is further desirable to increase the concurrency of systems in which multiple transactions perform operations which affect or use the same bitmap.

SUMMARY OF THE INVENTION

A method and apparatus are provided for segmenting the bitmaps stored in a bitmap index.

According to one aspect of the invention, a bitmap is represented by a plurality of bitmap segments. Each bitmap segment corresponds to a range of records within the body of data associated with the bitmap index. Rather than treating each bitmap as an atomic unit, the database system is able to manipulate each bitmap segment independently relative to the other bitmap segments.

There may be gaps that exist between the ranges represented by a set of bitmap segments. Thus, if the body of data associated with the bitmap index does not contain records that fall into a particular range, the bitmap index does not store bitmap segments to cover that range of non-existent records. Similarly, the bitmap index does not have to store bitmap segments to cover ranges of records that would all be represented by the same bit value.

According to one aspect of the invention, each bitmap segment is protected by its own lock, thereby allowing multiple bitmap segments associated with the same criteria to be accessed and updated simultaneously. In addition, when a bitmap segment is updated, a log is generated that indicates only the new version of that bitmap segment, rather than the entire bitmap.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram that illustrates a table for which a bitmap index may be used;

FIG. 3A is a block diagram of a table that contains 5,000 rows; and

FIG. 3B is a block diagram that illustrates the various bitmap segments of a segmented bitmap associated with the table illustrated in FIG. 3A according to an embodiment of the invention.

DETAILED DESCRIPTION OF THE PREFERRED EMBODIMENT

Figure 2:
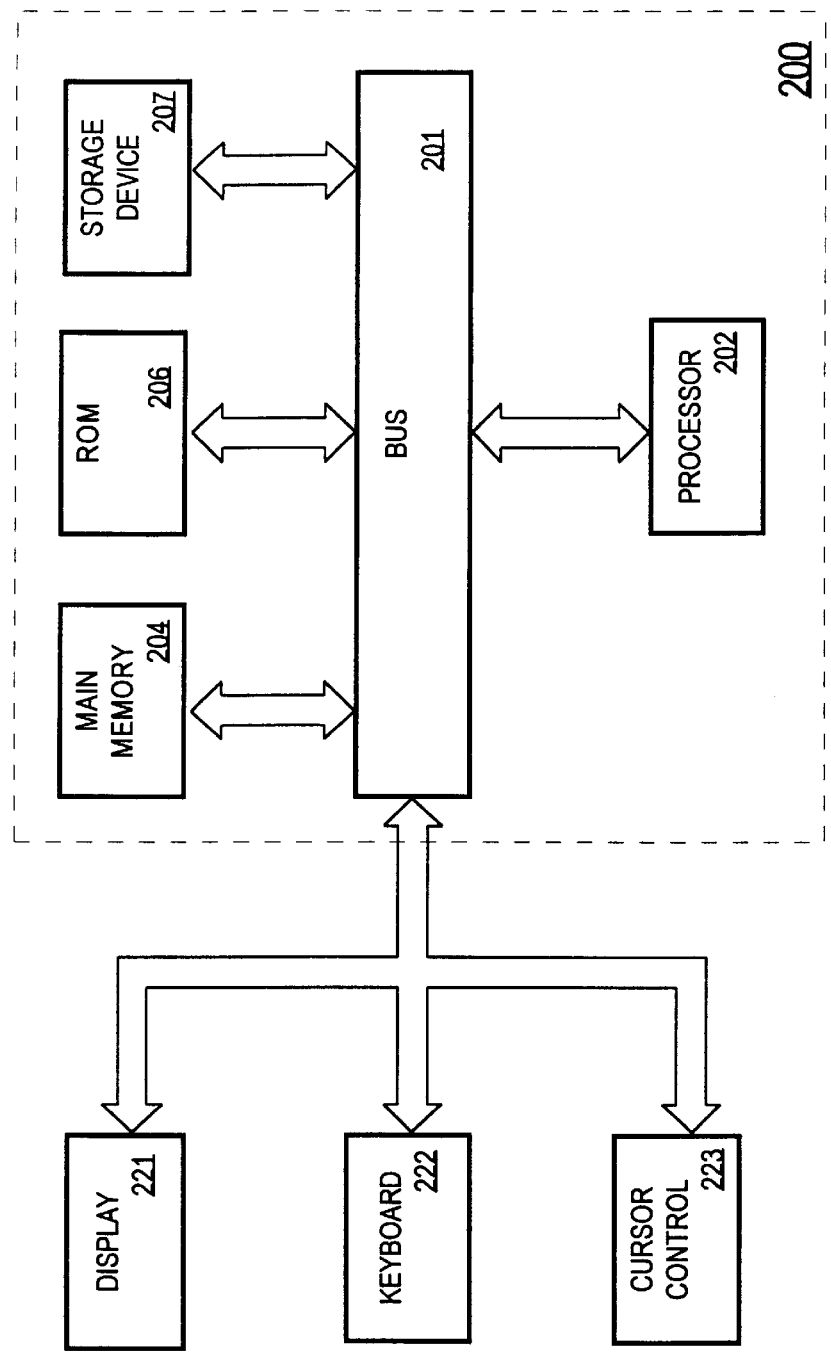
FIG. 2 is a block diagram of a computer system that may be used to implement an embodiment of the invention.

A method and apparatus for storing and using bitmap segments is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Referring to FIG. 2, it is a block diagram of a computer system 200 upon which an embodiment of the present invention can be implemented. Computer system 200 includes a bus 201 or other communication mechanism for communicating information, and a processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202. Data storage device 207 is coupled to bus 201 for storing information and instructions.

A data storage device 207 such as a magnetic disk or optical disk and its corresponding disk drive can be coupled to computer system 200. Computer system 200 can also be coupled via bus 201 to a display device 221, such as a cathode ray tube (CRT), for displaying information to a computer user. An alphanumeric input device 222, including alphanumeric and other keys, is typically coupled to bus 201 for communicating information and command selections to processor 202. Another type of user input device is cursor control 223, such as a mouse, a trackball, or cursor direction keys for communicating direction information and command selections to processor 202 and for controlling cursor movement on display 221. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 222 wherein all interface is provided via the stylus as a writing instrument (like a pen) and the written text is interpreted using optical character recognition (OCR) techniques.

The present invention is related to the use of computer system 200 to store and manipulate bitmap segments. According to one embodiment, the storage, use and manipulation of bitmap segments are performed by computer system 200 in response to processor 202 executing sequences of instructions contained in memory 204. Such instructions may be read into memory 204 from another computer-readable medium, such as data storage device. Execution of the sequences of instructions contained in memory 204 causes processor 202 to perform the process steps that will be described hereafter. In alternative embodiments, hard-wired circuitry may be used in place of or in combination with software instructions to implement the present invention. Thus, the present invention is not limited to any specific combination of hardware circuitry and software.

Segmented Bitmaps

According to an embodiment of the invention, bitmaps in a bitmap index may be split into two or more smaller segments ("bitmap segments") so that each segment covers only a part of the space of the records associated with the bitmaps. Each bitmap segment is stored as a separated entity together with information of which range of records the bitmap segment covers.

For example, a bitmap segment may cover the first 5000 rows in a relational table. In this context, "first" may be relative to the logical or physical order in which the rows are stored. The bitmap segment may then be stored in the form:

<key value><start-rowid><end-rowid><bitmap> where the start-and end-rowids are the addresses (logical or physical) of rows 1 and 5000 in the table. The bitmap segments could optionally be compressed using any applicable data compression technique.

Storage of an end-rowid as well as a start-rowid in each bitmap segment yields significant advantages over approaches that store only a start-rowid. Specifically, it is only possible to determine whether a particular rowid is covered by a bitmap segment if both the upper and lower bounds of the range covered by the bitmap segment are known. If ranges are fixed-length, then the upper bound may be derived from the lower bound. However, being limited to fixed-length ranges significantly reduces the flexibility of the system. In systems that support bitmap segments that cover variable-length ranges, it is possible to derive the upper bound of the range based on the lower bound by determining the size of the bitmap contained in the segment. However, the overhead associated determining the size of the bitmap contained in each bitmap segment may render this approach impractical, especially in embodiments that employ compressed bitmaps.

FIG. 3a illustrates a table 300 that has five thousand rows, while FIG. 3b illustrates a set of bitmap segments 304, 306 and 308 that comprise the bitmap 302 associated with the table 300 for the key value "M". Bitmap segment 304 includes bits that correspond to rows 1 through 999. Bitmap segment 306 includes bits that correspond to rows 1000 through 2999. Bitmap segment 308 includes bits that correspond to rows 3000 through 5000.

Bitmaps that are represented by bitmap segments are referred to herein as segmented bitmaps. The combined ranges of the bitmap segments that belong to a segmented bitmap do not necessarily cover the entire range of records associated with the segmented bitmap. For example, if table 300 does not contain rows with row identifiers between 2500 and 2800, then the ranges of the segmented bitmaps associated with table 300 will not necessarily cover the rowid range between 2500 and 2800.

The ability to selectively exclude rowid ranges from a segmented bitmap is particularly useful in systems that assign rowids in a manner that allows for gaps. For example, a database system may assign rowids based on the address of the data blocks on which rows are stored. A first set of data blocks that are not storing rows of a table may be physically or logically located between a second set and a third set of data blocks that are storing rows for the table. Therefore, the table will contain rows that are assigned rowids that correspond to the second and third sets of data blocks, but will not contain rows that have been assigned rowids that correspond to the first set of data blocks.

Further, if all rows of table 300 that fall within a particular range either have or do not have a key value associated with a segmented bitmap, then the segmented bitmap may not have a bitmap segment that covers that particular range. Rather, the database system may simply store data that indicates that all rows in that particular range either do or do not have the key value.

By being able to leave gaps in the ranges covered by bitmap segments, the database system can avoid the need to store bitmap bits for ranges of rows that do not exist. In addition, bitmaps may not be the most efficient way to represent some ranges of rows (e.g. ranges that would all be represented by the same value). These ranges of rows may be represented with data other than a bitmap, while data on either or both sides of the range may be represented by bitmap segments. For example, if all rows in the range of 5 to 50000 would be represented as "1"s in a bitmap, the range may be represented by the data <5,50000, "1">, while the ranges on both sides of the range are represented by bitmap segments.

Database systems may avoid many of the problems associated with the maintenance and use of bitmaps by segmenting bitmaps in the manner described above. For example, segmenting bitmaps improves locking granularity for concurrent updates because an entire segmented bitmap does not have to be treated as a single data item. Each bitmap segment is treated as a separate data item by the lock management mechanism. If a transaction changes the gender indicator of row 1 to "M", then the bit that corresponds to row 1 must be updated. In bitmap 302, the bitmap that corresponds to row 1 is located in bitmap segment 304. Rather than obtain a lock on bitmap 302, the transaction obtains a lock on bitmap segment 304. Because each transaction only obtains a lock on the bitmap segment that it needs to update, other transactions may concurrently obtain locks on and update bits that are located in the other bitmap segments.

In addition, the use of segmented bitmaps decreases the overhead associated with logging. In a consistency model with logging of changes to the data, only the changed version of a particular bitmap segment is recorded in the log, rather than the changed version of the entire bitmap. For example, if the gender indicator for row 1 of table 300 is changed to "M", the corresponding bit in bitmap segment 304 will be updated. To log this update, the updated version of bitmap segment 304 will be logged, rather than the updated version of the entire bitmap 302. Generating logs for updates to bitmap segments will typically consume significantly less processing time and disk-I/O relative to recording the entire bitmap as an atomic unit in the log for each change.

Many database operations only require access to a subset of the data in a bitmap. For example, a revision to a gender indicator of one row would require only one bit of the bitmap to be changed. According to one embodiment of the invention, the values <start-rowid>and <end-rowid>are used to determine which bitmap segments are required for an operation. Once the appropriate bitmap segments have been identified, only those bitmap segments that are involved in the operation are loaded from disk into dynamic memory. By allowing only the necessary bitmap segments to be loaded, segmented bitmaps provide improved performance in all such operations due to the decreased disk-I/O and memory usage. Further, in embodiments that use compressed data, decompression (when loading into dynamic memory) and compression (when storing back to disk) is only performed on the segment(s) involved in a particular operation rather than on the entire bitmap.

Segmented bitmaps also provide quicker processing of logical operations on bitmaps. When retrieving data using a bitmap index, if the bitmaps are stored in segments, and one bitmap has large numbers of consecutive zeroes, it is possible to avoid retrieving the corresponding segments for the other bitmap since the result of bitwise ANDing any bits with zeroes will always be zero. Similarly, it is possible to avoid retrieving the corresponding segments for another bitmap involved in an OR operation when one bitmap segment has a large number of consecutive ones. Avoiding the retrieval, decompression and processing of bitmap segments in this manner saves both disk I/O and processing time.

For the purposes of explanation, embodiments of the invention have been described with reference to a database system in which data is stored in rows within tables. However, the present invention is not limited to any particular type of storage formats. For example, a segmented bitmap may be associated with a class of objects, where each bit in the segmented bitmap indicates whether a corresponding object instance contains a key value associated with the segmented bitmap. In such an embodiment, each bitmap segment could store a start-OID and an end-OID to indicate the range of object instances to which the bitmap segment corresponds.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for indicating whether records in a body of data satisfy a particular criterion, the method comprising the steps of:

establishing a plurality of ranges for identifiers assigned to records in said body of records;

generating a plurality of bitmap segments that correspond to said plurality of ranges, wherein each bitmap segment includes data representing a sequence of bits that includes one bit for every record that has an identifier that falls within the range associated with said bitmap segment, wherein each bit in said sequence of bits is set to a value that indicates whether a record that corresponds to said bit satisfies said particular criterion; and storing data that indicates the range associated with each bitmap segment of said plurality of bitmap segments.

2. The method of claim 1 further comprising the steps of:

executing a transaction that affects whether a particular record in said body of records satisfies said particular criterion;

determining which bitmap segment contains a bit that corresponds to said particular record;

updating said bit in response to said transaction by performing the steps of obtaining a lock on the bitmap segment that contains said bit without obtaining a lock on the other of said plurality of bitmap segments; and after obtaining said lock, updating said bit to reflect whether said particular record satisfies said particular criterion.

3. The method of claim 1 further comprising the steps of:

executing a transaction that affects whether a particular record in said body of records satisfies said particular criterion;

determining which bitmap segment contains a bit that corresponds to said particular record;

updating said bit in response to said transaction by performing the steps of loading the bitmap segment that contains said bit from a persistent storage to a dynamic memory without loading any other of said plurality of bitmap segments; and after loading the bitmap segment that contains said bit, updating said bit to reflect whether said particular record satisfies said particular criterion.

4. The method of claim 3 further comprising the step of, in response to updating said bit, generating a log that records an updated version of the bitmap segment that contains said bit.

5. The method of claim 1 further comprising the steps of:

performing a logical operation that combines a first bitmap with a second bitmap, wherein the first bitmap is comprised of said plurality of bitmap segments, wherein said second bitmap indicates whether records in said body of records satisfy a second criterion;

wherein the step of performing the logical operation includes the steps of:

identifying a series of bits in said second bitmap that have a particular value;

determining an identifier range associated with said series of bits; and loading into dynamic memory only those bitmap segments of said plurality of bitmap segments that are associated with ranges that correspond to at least one identifier that falls outside said identifier range.

6. The method of claim 1 wherein the step of generating a plurality of bitmap segments that correspond to said plurality of ranges includes the steps of:

generating a first bitmap segment that corresponds to a first range;

generating a second bitmap segment that corresponds to a second range; and generating no bitmap segment for a third range that falls between said first range and said second range.

7. The method of claim 6 wherein:

records that have been assigned identifiers in said third range either all satisfy or all do not satisfy said particular criterion; and the method includes the step of storing data that indicates whether all records that have been assigned identifiers in said third range satisfy said particular criterion.

8. The method of claim 6 wherein no records within said body of records have been assigned identifiers in said third range.

9. A method for indexing a body of records, wherein all records in said body of records fall within a particular range, the method comprising the steps of:

generating a plurality of bitmap segments that indicate whether the records in said body of records contain a key value;

wherein each bitmap segment of said plurality of bitmap segments corresponds to a subrange of said particular range;

performing an update to a record in said body of records, wherein said update affects whether said record contains said key value;

in response to performing said update, performing the steps of determining the subrange into which said record falls;

loading into dynamic memory only the bitmap segment of said plurality of bitmap segments that corresponds to the subrange into which said record falls; and updating a bit in said bitmap that corresponds to said record to indicate whether said record contains said key value.

10. The method of claim 9 further comprising the step of causing a plurality of processes to concurrently operate on different segments of said plurality of segments.

11. The method of claim 9 wherein the step of generating a plurality of bitmap segments includes generating a first bitmap segment for a first subrange of said particular range and a second bitmap segment for a second subrange of said particular range without generating any bitmap segment for a subrange that falls between said first subrange and said second subrange.

12. The method of claim 9 further comprising the step of generating a log in response to updating said bitmap segment, wherein said log indicates a version of said bitmap segment but not any other of said plurality of bitmap segments.

13. The method of claim 9 wherein the step of generating a plurality of bitmap segments includes generating, for each bitmap segment, data that indicates said subrange associated with said bitmap segment and a string of bits that includes one bit for every record in said subrange associated with said bitmap segment.

14. A computer-readable medium carrying one or more sequences of one or more instructions for indicating whether records in a body of data satisfy a particular criterion, the one or more sequences of one or more instructions including instructions which when executed by one or more processors, cause the one or more processors to perform the steps of:

establishing a plurality of ranges for identifiers assigned to records in said body of records;

generating a plurality of bitmap segments that correspond to said plurality of ranges, wherein each bitmap segment includes data representing a sequence of bits that includes one bit for every record that has an identifier that falls within the range associated with said bitmap segment, wherein each bit in said sequence of bits is set to a value that indicates whether a record that corresponds to said bit satisfies said particular criterion; and storing data that indicates the range associated with each bitmap segment of said plurality of bitmap segments.

15. The computer-readable medium of claim 14 further comprising sequences of instructions for performing the steps of:

executing a transaction that affects whether a particular record in said body of records satisfies said particular criterion;

determining which bitmap segment contains a bit that corresponds to said particular record;

updating said bit in response to said transaction by performing the steps of obtaining a lock on the bitmap segment that contains said bit without obtaining a lock on the other of said plurality of bitmap segments; and after obtaining said lock, updating said bit to reflect whether said particular record satisfies said particular criterion.

16. The computer-readable medium of claim 14 further comprising sequences of instructions for performing the steps of:

executing a transaction that affects whether a particular record in said body of records satisfies said particular criterion;

determining which bitmap segment contains a bit that corresponds to said particular record;

updating said bit in response to said transaction by performing the steps of loading the bitmap segment that contains said bit from a persistent storage to a dynamic memory without loading any other of said plurality of bitmap segments; and after loading the bitmap segment that contains said bit, updating said bit to reflect whether said particular record satisfies said particular criterion.

17. The computer-readable medium of claim 16 further comprising sequences of instructions for performing the step of, in response to updating said bit, generating a log that records an updated version of the bitmap segment that contains said bit.

18. The computer-readable medium of claim 14 further comprising sequences of instructions for performing the steps of:

performing a logical operation that combines a first bitmap with a second bitmap, wherein the first bitmap is comprised of said plurality of bitmap segments, wherein said second bitmap indicates whether records in said body of records satisfy a second criterion;

wherein the step of performing the logical operation includes the steps of:

identifying a series of bits in said second bitmap that have a particular value;

determining an identifier range associated with said series of bits; and loading into dynamic memory only those bitmap segments of said plurality of bitmap segments that are associated with ranges that correspond to at least one identifier that falls outside said identifier range.

19. The computer-readable medium of claim 14 wherein the step of generating a plurality of bitmap segments that correspond to said plurality of ranges includes the steps of:

generating a first bitmap segment that corresponds to a first range;

generating a second bitmap segment that corresponds to a second range; and generating no bitmap segment for a third range that falls between said first range and said second range.

20. The computer-readable medium of claim 19 wherein:

records that have been assigned identifiers in said third range either all satisfy or all do not satisfy said particular criterion; and the computer-readable medium includes sequences of instructions for performing the step of storing data that indicates whether all records that have been assigned identifiers in said third range satisfy said particular criterion.

21. The computer-readable medium of claim 19 wherein no records within said body of records have been assigned identifiers in said third range.

22. The method of claim 1, wherein the step of storing data that indicates the range associated with each bitmap segment of said plurality of bitmap segments includes storing in a bitmap segment data that indicates the range associated with the bitmap segment.

23. The method of claim 22, wherein the step of storing in a bitmap segment data that indicates the range associated with the bitmap segment includes storing in a bitmap segment data that indicates the beginning of the range associated with said bitmap.

24. The method of claim 23, wherein the step of storing in a bitmap segment data that indicates the beginning of the range associated with said bitmap segment includes storing in a bitmap segment data that indicates the beginning of the range associated with said bitmap segment and the end of the range associated with said bitmap segment.

25. The method of claim 1, wherein the step of storing data that indicates the range associated with each bitmap segment of said plurality of bitmap segments includes storing data that indicates the beginning of the range associated with each bitmap segment of said plurality of bitmap segments and the end of the range associated each bitmap segment of said plurality of bitmap segments.

26. The computer-readable medium of claim 14, wherein the step of storing data that indicates the range associated with each bitmap segment of said plurality of bitmap segments includes storing in a bitmap segment data that indicates the range associated with the bitmap segment.

27. The computer-readable medium of claim 26, wherein the step of storing in a bitmap segment data that indicates the range associated with the bitmap segment includes storing in a bitmap segment data that indicates the beginning of the range associated with said bitmap.

28. The computer-readable medium of claim 27, wherein the step of storing in a bitmap segment data that indicates the beginning of the range associated with said bitmap segment includes storing in a bitmap segment data that indicates the beginning of the range associated with said bitmap segment and the end of the range associated with said bitmap segment.

29. The computer-readable medium of claim 14, wherein the step of storing data that indicates the range associated with each bitmap segment of said plurality of bitmap segments includes storing data that indicates the beginning of the range associated with each bitmap segment of said plurality of bitmap segments and the end of the range associated each bitmap segment of said plurality of bitmap segments.

30. A computer-readable medium carrying one or more sequences of one or more instructions for indexing a body of records, wherein all records in said body of records fall within a particular range, the one or more sequences of one or more instructions including instructions which, when executed by one or more processors, cause the one or more processors to perform the steps of:

generating a plurality of bitmap segments that indicate whether the records in said body of records contain a key value;

wherein each bitmap segment of said plurality of bitmap segments corresponds to a subrange of said particular range;

performing an update to a record in said body of records, wherein said update affects whether said record contains said key value;

in response to performing said update, performing the steps of determining the subrange into which said record falls;

loading into dynamic memory only the bitmap segment of said plurality of bitmap segments that corresponds to the subrange into which said record falls; and updating a bit in said bitmap that corresponds to said record to indicate whether said record contains said key value.

31. The computer-readable medium of claim 30 further comprising sequences of instructions for performing the step of causing a plurality of processes to concurrently operate on different segments of said plurality of segments.

32. The computer-readable medium of claim 30 wherein the step of generating a plurality of bitmap segments includes generating a first bitmap segment for a first subrange of said particular range and a second bitmap segment for a second subrange of said particular range without generating any bitmap segment for a subrange that falls between said first subrange and said second subrange.

33. The computer-readable medium of claim 30 further comprising sequences of instructions for performing the step of generating a log in response to updating said bitmap segment, wherein said log indicates a version of said bitmap segment but not any other of said plurality of bitmap segments.

34. The computer-readable medium of claim 30 wherein the step of generating a plurality of bitmap segments includes generating, for each bitmap segment, data that indicates said subrange associated with said bitmap segment and a string of bits that includes one bit for every record in said subrange associated with said bitmap segment.

* * * * *